United States Patent [19]

Kovacs

[11] 4,312,798

[45] Jan. 26, 1982

[54] POLYURETHANE COATING SOLUTIONS OR DISPERSIONS

[75] Inventor: Jenoe Kovacs, Bobenheim-Roxheim, Fed. Rep. of Germany

[73] Assignee: BASF Aktiengesellschaft, Ludwigshafen, Fed. Rep. of Germany

[21] Appl. No.: 102,086

[22] Filed: Dec. 10, 1979

[30] Foreign Application Priority Data

Dec. 15, 1978 [DE] Fed. Rep. of Germany ....... 2854192

[51] Int. Cl.³ .............................................. C08L 75/08
[52] U.S. Cl. ..................... 260/29.2 TN; 260/29.6 NR; 260/30.4 N; 260/31.6; 260/32.8 N; 428/379; 428/425.8; 428/426; 428/430; 528/66; 528/75; 528/81; 528/83

[58] Field of Search ............... 260/29.2 TN, 29.6 NR; 528/66, 75, 81, 83

[56] References Cited

U.S. PATENT DOCUMENTS

| | | | |
|---|---|---|---|
| 4,070,323 | 1/1978 | Vanderhoff et al. | 260/29.6 NR |
| 4,128,537 | 12/1978 | Markiewitz | 528/49 |
| 4,165,414 | 8/1979 | Narayan et al. | 521/129 |

Primary Examiner—Theodore E. Pertilla
Attorney, Agent, or Firm—Norbert M. Lisicki

[57] ABSTRACT

The invention relates to polyurethane coatings prepared from the reaction products of a polyester or polyether, a hydroxyl compound containing acetylenic or ethylenic unsaturation and an organic polyisocyanate.

12 Claims, No Drawings

4,312,798

POLYURETHANE COATING SOLUTIONS OR DISPERSIONS

BACKGROUND OF THE INVENTION

1. Field of the Invention

This invention relates to polyurethane solutions and dispersions, their preparation, and the use thereof. More particularly, this invention relates to polyurethane solutions or dispersions useful as polyurethane coatings prepared from a solvent or dispersion of the reaction products of a polyester or a polyether, a hydroxyl compound having acetylenic or ethylenic unsaturation, and an organic polyisocyanate.

2. Description of the Prior Art

Solutions or dispersions of polyurethanes manufactured from hydroxyl group-containing polyesters and isocyanates employed for the manufacture of coatings or wire lacquers are known from the prior art (German Application No. 17 29 201 and German Published Application No. 25 37 207).

All of these polyurethane coatings have the disadvantage that they either contain free isocyanates, which are very sensitive to moisture upon storage, or they contain capping agents such as cresols, phenols, maleic esters, caprolactam, etc., which are evolved during the baking process and can create environmental hazards.

It is the purpose of this invention to prepare polyurethane solutions and/or dispersions, which are storage stable both in the organic and aqueous phase, which do not contain any environmentally hazardous capping agents, and which are suitable as multiple-use coating agents.

DESCRIPTION OF THE PREFERRED EMBODIMENTS

According to the instant invention, this can be achieved by producing and using a polyurethane in solution or as dispersion of a certain composition containing acetylenic or ethylenic unsaturation.

The instant invention relates to polyurethane solutions or dispersions comprising
  (A) 30 to 80 percent by weight of at least one solvent or dispersion agent,
  (B) 70 to 20 percent by weight of a reaction product consisting of
    (a) 80 to 10 percent of a polyester or polyether having a hydroxyl number greater than 20,
    (b) 5 to 60 percent by weight of at least one hydroxyl compound containing acetylenic or ethylenic unsaturation, and
    (c) 10 to 70 percent by weight of an organic polyisocyanate.

The object of this invention, furthermore, is a process for the manufacture of the polyurethane solutions and/or dispersions according to this invention as well as their use for surface coatings, for lacquer coating of wires, for the manufacture of powdered lacquers, and as multi-layer adhesive.

The objects can be advantageously accomplished with the polyurethane solutions and/or dispersions according to the instant invention.

Accordingly, a certain part of the polyester or polyether is replaced by hydroxyl compounds containing acetylenic and ethylenic unsaturation and reacted in suitable solvents with organic polyisocyanates.

Thus, the mole ratios of the starting components are of considerable importance. For the manufacture of aqueous dispersions, the polyurethanes are initially obtained from the above-mentioned components in low-boiling solvents. Subsequently, the solutions are mixed with water containing protecting colloids and/or emulsifiers and the solvent is distilled off. Depending upon the degree of dispersion, coarse or fine particle dispersions are obtained.

Mixtures of polyesters and/or polyethers, as well as, for example, propargyl alcohol and/or allyl alcohol and their derivatives with organic polyisocyanates are used for the manufacture of the coatings according to this invention.

It is advantageous to react the acetylenic or ethylenic unsaturated containing hydroxyl compounds with the polyisocyanates first (which results in partially capped polyisocyanates) since the polyisocyanates are generally used in excess relative of the total OH groups. The polyisocyanates which remain unbonded are subsequently reacted with the OH groups of the polyesters or polyethers. The reduction in the amount of isocyanate groups during the reaction can be followed titrimetrically. The reaction generally takes place at a temperature range between room temperature and +150° C., depending upon the solvent, within a period of 0.5 hour to 20 hours. The reaction is considered completed when the isocyanate content has dropped below 0.5 percent. Following this process, the desired viscosity of the solutions can be adjusted or the organic or aqueous dispersions may be produced. In order to accelerate the reaction between the OH groups and the polyisocyanates, it is advantageous to use catalysts in a concentration of 0.1 to 2.0 percent. Generally suitable catalysts are tertiary amines.

(A) Possible solvents which may be employed include organic solvents such as ether, ester and ether-/esters, for instance, tetrahydrofuran, dioxane, acetic acid ester, ethylene glycol acetate, halogenated hydrocarbons such as methylene chloride, and preferably, polar solvents such as dimethylformamide, dimethylacetamide, gamma-butyrolactone, N-methylpyrollidone, ketones such as methylethyl ketone, cyclohexanone, and mixtures thereof.

Suitable dispersion agents include organic solvents such as xylene, various petroleum fractions, cycloaliphatics, and in particular, water.

The polyurethane solutions and/or dispersions according to this invention contain component (A) in quantities of 30 to 80, preferably 50 to 70, percent by weight.

(B) Components comprising reaction product (B) include the following:
  (a) the raw materials commonly used for the manufacture of polyurethanes are the hydroxyl group-containing polyesters and/or polyethers as well as organic polyisocyanates. Details concerning these materials, their manufacture and properties may be found in the chapter "Polyurethanes" in Houben-Weyl, Methods of Organic Chemistry, Vol. XIV/2 (1963), pages 77–98.

Preferred polyesters are the reaction products of aliphatic or aromatic dicarboxylic acids such as adipic acids, terephthalic acids, isophthalic acids, phthalic acids, or azelaic acids, and their derivatives with, preferably, aliphatic diols such as ethylene glycol, diethylene glycol, triethylene glycol, neopentyl glycol. The higher functionality alcohols such as trimethylolpropane, glycerine, trimethylolbenzol, or tris-hydroxyethyl isocyanurate are preferably used as cross-linking agents. Possible polyethers include among others, polyethylene glycol, polypropylene glycol, or polytetrahydrofuran. The possible polyesters and polyethers which may be employed include those disclosed in U.S. Pat. No. 4,165,414, the disclosure of which is hereby incorporated by reference.

The hydroxyl numbers of the polyesters or the polyethers are greater than 20, preferably between 50 and 600, most preferably between 100 and 500. They generally have molecular weights preferably from 500 to 5000 and most preferably of 1000 to 2000.

(c) Among the organic polyisocyanates are included, hexamethylene diisocyanate, 4,4-diphenylmethane diisocyanate, toluene diisocyanate, isophorone diisocyanate, naphthalene diisocyanate, as well as higher condensed products such as the trimerization product of toluene diisocyanate, or the reaction product of one mole of trimethylolpropane and 3 moles of toluene diisocyanate.

Preferably employed are organic polyisocyanates based on aromatic polyisocyanates having an isocyanate content between 5 and 60 percent. Also included are those polyisocyanates disclosed in U.S. Pat. No. 4,165,414, the disclosure of which is hereby incorporated by reference.

Component (a) is used in quantities of 80 to 10 weight percent, preferably 70 to 20 percent by weight, while component (c) is used in quantities of 10 to 70 weight percent, preferably 20 to 50 percent by weight, to prepare reaction product (B).

(b) Possible hydroxyl compounds containing acetylenic or ethylenic unsaturation include monomers such as propargyl alcohol, allyl alcohols or similar compounds such as 1-butyn-3-ol, 1-pentyn-3-methyl-3-ol, 1-pentyn-3-methyl-3-ol, 1-hexyn-3-propyl-3-ol, and 1-ethylene cyclohexanol. The hydroxyl number of such monomers is between 200 and 1100, preferably 400 and 1000.

The mole ratio of polyester or polyether to the compound containing acetylenic or ethylenic unsaturation is from 1:2.5 to 1:1.

Possible catalysts for the urethane formation are tertiary amines such as dimethylbenzylamine, pentamethyldiethylamine, or tin compounds such as dibutyltin dilaurate, in a concentration from 0.1 to 2.0, preferably from 0.2 to 0.5 percent by weight based on the weight of the OH compounds.

The weight ratios of (a) polyesters and/or polyethers ranges from 80 to 10 percent by weight, (b) compounds containing acetylenic or ethylenic unsaturation range from 5 to 60 percent by weight, and (c) organic polyisocyanates range from 10 to 70 percent by weight.

The mole ratios between total OH groups and isocyanates are between 0.5:1.5 to 1.5:0.5, preferably 1:1.

Possible dispersion agents for the manufacture of organic polyurethane dispersions are various high-boiling petroleum fractions such as gasoline fractions, as well as xylenes and higher-boiling cycloaliphatic compounds.

Low-boiling solvents, such as methylethyl ketone, toluene, methylene chloride, acetic acid ester, tetrahydrofuran, dioxane and similar solvents, are preferably used as the reaction medium for the preparation of aqueous dispersions. The solids contents of these polyurethane solutions are 10 to 60 percent, preferably 10 to 40 percent by weight.

The aqueous dispersions according to this invention also contain 0.1 to 15 percent by weight of the commonly employed dispersing agents, preferably water-soluble, high molecular weight organic compounds such as polyvinyl alcohols, with residual acetate groups up to 30 mole percent, polyvinyl pyrrolidone, copolymers of vinyl propionate and vinyl pyrrolidone, polyacrylic acids, partially saponified copolymers of acrylic esters, and acrylonitriles, cellulose ether, gelatin or mixtures of these materials.

Emulsifiers which may be used in addition as protective colloids include, for example, surface-active nonionic compounds such as $C_7$ to $C_{15}$ alcohols reacted with 5 to 12 moles of ethylene oxide.

Additionally, other commonly used additives such as fillers, flow improvers, thickeners, neutralizing agents, antithixotropic agents, may be added to the polyurethane solutions and/or dispersions according to this invention in quantities up to 40 percent by weight. These substances may be added to the initial solutions or to the completed dispersion as long as they are water-soluble or water-dispersible.

The preferred manufacturing process consists of dissolving the polyesters and/or polyethers together with the hydroxyl compounds containing acetylenic or ethylenic unsaturation in an inert solvent and subsequently mixing the solution with the organic polyisocyanate. The reaction between the hydroxyl groups and the isocyanate groups, depending upon the hydroxyl compounds, begins at room temperature. When using propargyl alcohol or allyl alcohols, for example, the reaction takes place at 20° C. To complete the reaction of the hydroxyl groups when polyesters are employed, the temperature may be increased to the boiling point of the solvent. The reduction of the isocyanate content is followed by titration. The reaction is considered completed when the isocyanate content drops below 0.5 percent by weight.

In order to produce dispersions, the solutions are then cooled to, for example, +40° C. and are mixed with protective colloid-containing and/or emulsifier-containing precipitation agents or water while being vigorously agitated. The result is an emulsion. When reclaiming the solvent, the temperature should not exceed +100° C. since a premature polymerization of the acetylenic or ethylenic unsaturated compounds could take place if this temperature were exceeded. If necessary, the work should be conducted under reduced pressure. When reclaiming the solvents, it is advantageous to work with agitators and baffles. The speed of rotation of the agitators should reach 50 to 500 meters per minute, preferably 100 to 400 meters per minute. The form of the agitator is also important.

The maximum particle size of the dispersion is less than 5 microns. The average diameter is between 0.05 and 2 microns. If required, the dispersion particles can be crushed with a ball mill.

The dispersions have excellent storage stability. They are suited for the production of thin (2 to 4 microns) coatings having very good mechanical, electrical and thermal properties on copper wires. Special mention should be made of the lead pencil hardness, the softening point, and the tin plating ability of the lacquer coatings. In spite of a high cross-linking density, the elasticity of the coatings does not deteriorate.

The lacquer solutions or dispersions according to this invention are advantageously used for coating surface substrates of various types, particularly of metal surfaces or of electric conductors. In order to manufacture coatings, the solutions are adjusted to a spraying or pouring viscosity and are applied with the appropriate equipment. For wire coating, the solutions or dispersions are placed in commonly-used wire lacquering machinery. The wires are dipped into the solution several times, the excess solution is removed, and the wires baked at elevated temperatures such as 250° to 550° C. During the baking process, a thermal polymerization of the multiple bonds takes place. To accelerate the cross-linking, it is possible to use radical-forming catalyts such as peroxides, or azo compounds. The concentration of the catalysts is 0.2 to 5 percent by weight, preferably 0.5 to 2 percent by weight.

Other advantageous application possibilities for the polyurethane solutions and/or dispersions according to this invention are multiple-layer adhesives and powdered lacquers. The latter may be obtained, for instance, by spray drying or freeze drying the polyurethane solutions or dispersions of to this invention.

The following examples illustrate the nature of the invention. Unless otherwise stated, all parts and percentages are by weight.

EXAMPLE 1

In a reaction flask equipped with a reflux condenser, 20.6 parts of propargyl alcohol with 125 parts of a polyester prepared from reacting adipic acid, phthalic anhydride, trimethylolpropane, and propylene glycol, and having a hydroxyl number of 165, are dissolved in 489.3 parts of ethylene glycol acetate. The solution is subsequently mixed with 64.1 parts of toluene diisocyanate and 0.5 parts of dimethylbenzylamine. The mixture begins reacting immediately. When the reaction slows down, the temperature of the mixture is increased to 70° C. After a reaction period of 6 hours, the isocyanate content reaches 0.1 percent by weight. Subsequently, the temperature is reduced to 40° C. This solution is then diluted to 20 percent solids with Solvesso 100.

A 50 micron thick film is poured onto a glass plate and is baked at 200° C. for 15 minutes. The flexibility, clarity and the lead-pencil hardness of the coating are excellent (4 to 5 H). Coatings on steel sheets display a pendulum hardness of 75 (s) and good square-cut adhesion. The Erichsen value is 8.5 millimeters.

COMPARISON EXAMPLE A

The procedure of Example 1 was repeated except instead of propargyl alcohol, an equimolar concentration of n-propanol was added. The reaction was conducted in methylethylketone. The resulting dispersion had a flow-through time of 16 seconds (measured in the DIN$^4$ beaker) with a 30 percent solids content.

With this dispersion, 0.5 millimeter diameter copper wires were lacquered at 430° C. The lacquered wires had brittle properties. Further testing of the wires was therefore impossible.

EXAMPLE 2

In a reaction flask equipped with a condenser and receiving flask, 340.4 parts of a polyester prepared from reacting phthalic anhydride and trimethylolpropane and having a hydroxyl number of 400 and 53.2 parts of propargyl alcohol are dissolved in 1600 parts of methylethylketone. The solution is subsequently mixed with 292.16 parts of toluene diisocyanate. As a result of the reaction between toluene diisocyanate and propargyl alcohol, the temperature of the solution increases to 32° C. Upon completion of this reaction, 1.78 parts of dimethylbenzylamine are added as the accelerator. The temperature is then adjusted to 70° C. After a reaction time of 8 hours, the isocyanate content of the solution drops to 0.5 percent. At this point, the temperature is reduced to 40° C. and the solution with vigorous stirring is mixed with 685.9 parts of a 5 percent aqueous solution of a polyvinyl alcohol having a viscosity of 5 centipoise (2 percent aqueous solution), a hydroxyl number of 653 and a residual acetate content of 27 percent and with 2.29 parts of a $C_{13}$ alcohol reacted with 6 to 8 moles of ethylene oxide.

The result is an emulsion. The temperature of the mixture in the flask is increased to 95° C. within 3 hours. During this period, a total of 1600 parts of liquid is distilled off. The temperature is thereupon reduced to 40° C. and the solution in the flask is diluted with 914.5 parts of a 5 percent solution of a copolymer of vinyl propionate and vinyl pyrollidone to approximately a 30 percent solids content. The dispersion has a flow-through time of 32 seconds in the DIN$^4$ beaker.

Copper wires of 0.5 millimeter diameter are coated with this dispersion at 430° C. and with a lacquer coating rate of 20 to 24 meters per minute on a machine having a length of 2.5 meters. The properties of the lacquer coated wires are as follows:

| | |
|---|---|
| Increase in diameter: | 35–40 microns |
| Resistance to thermal shock: (DIN 46 453) | 185° C. |
| Soldering time (DIN 46 416): | 1.5 to 2.0 seconds |
| Softening point (DIN 53 180): | 220 to 240° C. |
| Lead-pencil Hardness: (DIN 46 453) | 5 to 6 H |

EXAMPLE 3

In a reaction flask equipped with a condenser and receiver, 479.9 parts of a polyester prepared from reacting adipic acid, 1,4-butanediol, and trimethylolpropane and having a hydroxyl number of 395, and 77.7 parts of allyl alcohol are dissolved in 2261 parts of tetrahydrofuran. While being heated, the solution is mixed with 411.5 parts of toluene diisocyanate and 2.5 parts of dimethylbenzylamine. The temperature is subsequently raised to 75° C. and the mixture is reacted for a period of 6 hours. The NCO content drops to 0.3 percent. Subsequently, the temperature is reduced to 35° C.

While being stirred vigorously, the flask contents are mixed with 968.7 parts of a 5 percent aqueous solution of a polyvinyl alcohol having a viscosity of 5 centipoise (in 2 percent aqueous solution), a hydroxyl number of 653 and a residual acetate content of 27 percent, and with 32.3 parts of a $C_{13}$ alcohol which was reacted with 6 to 8 moles of ethylene oxide. The temperature of the resulting mixture is increased to 99° C. within 3 hours.

A total of 2532 parts distillate are reclaimed. The temperature of the mixture in the flask is then reduced to 35° C. and the mixture is diluted with 1292 parts of a 5 percent solution of a copolymer of vinyl propionate and vinyl pyrollidone to a 30 percent solids content. The dispersion has a flow-through time of 16 seconds (measured in the DIN$^4$ beaker).

In order to increase the fineness of the dispersion, the dispersion is passed 6 times through a ball mill. The maximum particle size is 3 microns. Using a horizontal wire-coating machine 2.5 meters long, copper wires, 0.5 millimeter thick, are coated with the lacquer being applied at 18 to 24 meters per minute and at an oven temperature of 430° C. The properties of the lacquered wires are as follows:

| | |
|---|---|
| Increase in diameter: | 30–35 microns |
| Resistance to thermal shock: (DIN 46 453) | 155° C. |
| Soldering time (DIN 46 416): | 2.0 to 2.5 seconds |
| Softening point (DIN 53 180): | 200 to 220° C. |
| Lead-pencil Hardness: (DIN 46 453) | 4 to 5 H |

The embodiments of the invention in which an exclusive privilege or property is claimed are defined as follows:

1. A polyurethane solution or dispersion comprising (A) 30–80 percent by weight of a solvent or dispersion agent, and (B) 70–20 percent by weight of the reaction product consisting of (a) 80–10 percent by weight of a polyester or polyether having a hydroxyl number greater than 20 and (b) 5–60 percent by weight of at least one hydroxyl compound containing acetylenic unsaturation and (c) 10–70 percent by weight of an organic polyisocyanate.

2. The polyurethane solution or dispersion of claim 1 wherein component (A) is a polar solvent.

3. The polyurethane solution or dispersion of claim 1 wherein component (A) is a non-polar dispersion agent.

4. The polyurethane solution or dispersion of claim 1 wherein component (A) is water.

5. The polyurethane solution or dispersion of claim 2 wherein component (A) is water.

6. The polyurethane solution or dispersion of claim 1 wherein component (B) (a) is a polyester prepared by the reaction of a dicarboxylic acid, and a multifunctional alcohol wherein said polyester has a hydroxyl number from 50 to 600 and a mole weight from 500 to 5000.

7. The polyurethane solution or dispersion of claim 1 wherein component (B) (a) is a polyether with a hydroxyl number from 25 to 600.

8. The polyurethane solution or dispersion of claim 1 wherein the component (B) (b) is an aliphatic hydroxyl compound containing acetylenic unsaturation with a hydroxyl number from 200 to 1100.

9. The polyurethane solution or dispersion of claim 1 wherein component (B) (c) is an organic polyisocyanate having an isocyanate content of 5–60 percent.

10. A process for the manufacture of the polyurethane solution or dispersion of claim 1 wherein 70–20 percent by weight of the reaction of a mixture of component (B)a and (B)b in component (A) is reacted with component (B)c at a temperature below the boiling point of component (A) and the resulting solution is then mixed with a precipitating agent.

11. The process for the manufacture of the polyurethane dispersion of claim 1 wherein the component (B) in an inert organic solvent having a boiling point below 150° C. is mixed with water containing dispersing agents and the organic solvent is removed at temperatures below 100° C.

12. The process for the manufacture of polyurethane dispersions of claim 11 wherein the mixture is subjected to shearing forces while removing the organic solvent.

* * * * *